UNITED STATES PATENT OFFICE.

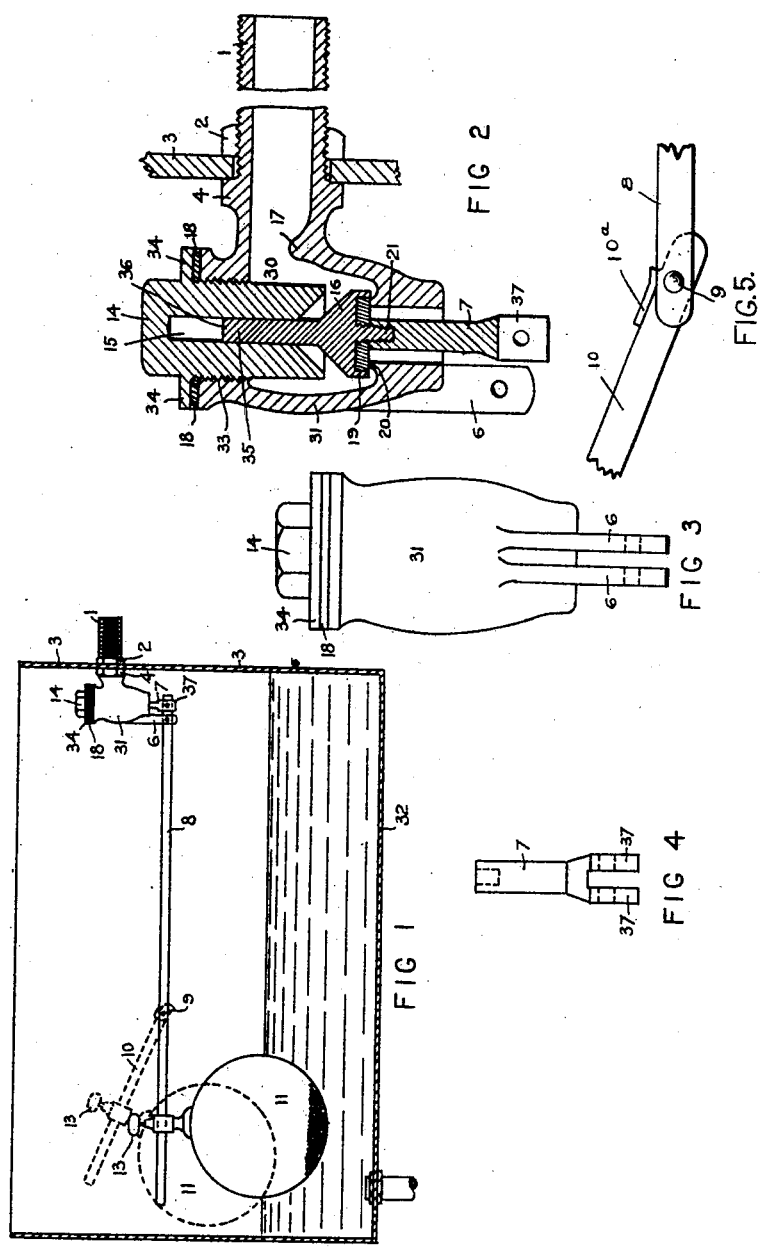

FRANK LONGSHAW AND CHARLES SCOTT ALLAN, OF DUNEDIN, NEW ZEALAND.

BALL COCK.

1,404,308.  Specification of Letters Patent.  Patented Jan. 24, 1922.

Application filed December 26, 1919. Serial No. 347,549.

*To all whom it may concern:*

Be it known that we, FRANK LONGSHAW and CHARLES SCOTT ALLAN, subjects of the British Empire, residing at Dunedin, in the Dominion of New Zealand, have invented a new and useful Ball Cock, of which the following is a specification.

This invention relates to ball cocks of the type in which a valve lies within a chamber inside the cock and is closed by the pressure of water supplied from a main or the like and is opened by the fall of a ball secured to a lever.

According to our invention a ball cock is provided which opens and closes quickly, will not leak by increased water pressure, minimizes noises ensuing on its opening and closing, provides a full way passage for water, minimizes the risk of sticking and accumulation of grit contained in some waters, closes and locks under water pressure and on the ball and lever being removed automatically closes and prevents waste of water. Our invention thus provides a ball cock of simple construction practically silent in operation and of more efficiency than usual. The invention consists in the features and combinations and arrangements of parts hereinafter described and more particularly pointed out in the claims. In the accompanying drawings illustrating the invention, Figure 1 is a longitudinal section of an ordinary cistern to which our improved ball cock is secured, Figure 2 is a section of the cock through the valve, Figure 3 is a full front face view of the cock showing the lugs for attachment of the lever, Figure 4 is a view of the vertical connecting spindle between the valve and the end of the lever. Fig. 5 is a detail elevation of the valve levers.

Extending into the chamber 30 within the cock 31, is a lip 17 integral with the cock for the purpose of directing the pressure of the supply water upward so as to cause the pressure to come evenly down on to the conical portion of the valve 16 which is hereinafter described. The inlet end 1 of the cock 31 is threaded as shown as far as a hexagonal boss 4 on the cock 31 which boss 4 is drawn tightly against the inside of the wall 3 of the cistern 32 by a nut 2 outside the cistern travelling on the threaded end 1. The usual feed water pipe is secured to this threaded end 1. Screwing into a threaded opening 33 in the top of the cock 31 is a nut member 14 provided with a cone shaped depression in its lower end and a socket 15 extending upwardly from said depression and a flange 34 which is tightly screwed down on to a seating 18 on the top of the cock 31 and in that position the nut member extends down into the chamber 30 below the lip 17 see Figure 2 of the drawings. This seating 18 prevents the water under pressure from leaking out of the chamber 30. A conical shaped spindle valve 16 within this chamber 30 has its spindle 35 adapted to work vertically upward and downward in the socket 15 of the nut member 14. The lower end of the valve 16 has a rim 19 which encases a leather or fibre washer, 20, and prevents said washer from spreading and keeps said washer flush with the bottom face of the valve 16. The upper surface of the conical shaped valve 16 when the spindle 35 thereof is moving upward in the socket 15 is checked by the cone shaped depression at the lower end of the nut member 14. The slope of the conical surface of the valve 16 may be varied to suit different flows or pressures, a greater surface being required for a low pressure. The threaded opening 33 in the top of the cock is of a diameter sufficient when the nut member 14 is unscrewed therefrom to allow of the extraction of the valve 16 therethrough thus simplifying the rewashering thereof. On a screw 21 in the under face of the valve 16 and passing downward through the washer 20 is screwed for detachability a vertical connecting spindle 7 whose lower end has forks 37 as shown in Figure 4, and which extends outside of and below the cock 31 through a lower opening therein. On the outside of the lower portion of the cock 31 is cast two lugs 6 see Figure 3 between which is secured by a pivot pin a two-part lever 8 said pivot pin being the fulcrum of this lever. The inner end of this lever 8 is secured by a pivot pin between the members 37 of the fork on the lower end of the vertical connecting spindle 7. At the other end of the lever 8 (which may be hollow) is a weighted hollow ball 11, whose weight is varied by the addition or subtraction of shot. This weight is about eleven ounces for pressures of water between 60 and 180 lbs. This weight varies with the pressure, the diameter of the supply pipes and the leverage.

This ball 11 is adjustably secured by a sliding member 12 and set screw 13 at a desired position on the lever 8 and also at an angle on either side thereof. In the case of W. C. cisterns and like a reduction of water pressure may take place by the opening of other taps on the system. This reduction in pressure is compensated for as follows. A swivel joint 9 is placed in the lever 8 which thereupon is in two parts hinged at the joint 9 and the part 10 has on its upper side, above the pivot, a shoulder 10ª which permits limited independent upward movement of said part 10 and then bears on the inner part of said lever. The ball 11 when adjusted by the set screw on the top of the free ended part 10 permits of the desired action so that as the water rises in the cistern the ball 11 and the part 10 rise and when they have risen to a certain height, further movement of the part 10 will move the remaining portion of the lever 8, causing the valve to quickly close and raise the inner portion of the lever and practically straighten the two portions of the lever 8 and leave the ball 11 wholly supported by the water in the cistern, so removing all weight from the lever and preventing any upward pressure on the spindle 7 which otherwise would have a tendency to raise the valve 16 from its seating. When the cistern is emptied the lever falls back to its horizontal position.

We claim—

A ball cock comprising a body having a water inlet, a water outlet in its lower side, a chamber above said outlet, an opening above said chamber and an upwardly directed lip in the lower side of said inlet; a valve to seat on the side of the outlet and having an upwardly extending stem, and a nut threaded in said opening and having a tubular lower portion extending downwardly in said chamber to a point below the level of said lip, said tubular portion forming a guide socket for the valve stem and also forming a shield which coacts with the lip to minimize pressure of the water downwardly on the valve and prevent water hammer.

In testimony whereof we affix our signatures in presence of two witnesses.

FRANK LONGSHAW.
CHARLES SCOTT ALLAN.

Witnesses:
Douglas Ramsay,
Owen E. Massie.